United States Patent
Hofrichter et al.

(10) Patent No.: US 11,875,925 B2
(45) Date of Patent: Jan. 16, 2024

(54) THERMISTOR, VARISTOR OR CAPACITOR COMPONENT WITH A FUSIBLE CONNECTING ELEMENT BETWEEN THE MAIN BODY OF THE COMPONENT

(71) Applicant: TDK Electronics AG, Munich (DE)

(72) Inventors: Alfred Hofrichter, Hartberg (AT); Franz Rinner, Frauental an der Lassnitz (AT)

(73) Assignee: TDK Electronics AG, Munich (DE)

( * ) Notice: Subject to any disclaimer, the term of this patent is extended or adjusted under 35 U.S.C. 154(b) by 19 days.

(21) Appl. No.: 17/594,233

(22) PCT Filed: Feb. 25, 2020

(86) PCT No.: PCT/EP2020/054914
§ 371 (c)(1),
(2) Date: Oct. 7, 2021

(87) PCT Pub. No.: WO2020/211997
PCT Pub. Date: Oct. 22, 2020

(65) Prior Publication Data
US 2022/0148767 A1    May 12, 2022

(30) Foreign Application Priority Data
Apr. 18, 2019   (DE) .................... 10 2019 110 374.6

(51) Int. Cl.
*H01C 7/00*   (2006.01)
*H01C 1/14*   (2006.01)
(Continued)

(52) U.S. Cl.
CPC ............. *H01C 7/008* (2013.01); *H01C 1/144* (2013.01); *H01C 1/1406* (2013.01);
(Continued)

(58) Field of Classification Search
CPC ...... H01C 7/10; H01C 1/1406; H01C 1/1413; H01C 1/144
See application file for complete search history.

(56) References Cited

U.S. PATENT DOCUMENTS 3,717,798 A * 2/1973 Kahn .................... H01C 7/102
257/769
5,006,953 A    4/1991 Hirama
(Continued)

FOREIGN PATENT DOCUMENTS

DE    3924140 A1    2/1990
DE    10227563 A1   1/2004
(Continued)

OTHER PUBLICATIONS

DE102015102866, machine translation. (Year: 2016).*
(Continued)

*Primary Examiner* — Kyung S Lee
(74) *Attorney, Agent, or Firm* — Nixon Peabody LLP

(57) ABSTRACT

An electrical component comprises a main body and at least one external electrode that is fastened by a connecting material to the main body. The main body and the external electrode have different coefficients of thermal expansion that determine a critical temperature which, when exceeded, results in a connection between the main body and the external electrode experiencing mechanical stresses that lead to damage to the component. The connecting material has a melting point which is lower than a critical temperature.

19 Claims, 1 Drawing Sheet

(51) Int. Cl.
*H01C 1/144* (2006.01)
*H01C 7/10* (2006.01)
*H01G 2/14* (2006.01)

(52) U.S. Cl.
CPC .............. *H01C 1/1413* (2013.01); *H01C 7/10* (2013.01); *H01G 2/14* (2013.01)

(56) References Cited

U.S. PATENT DOCUMENTS

| | | | |
|---|---|---|---|
| 5,210,516 A * | 5/1993 | Shikama | H04N 9/29 338/327 |
| 5,221,038 A | 6/1993 | Melton | |
| 2009/0102599 A1 | 4/2009 | Thomas | |
| 2010/0013591 A1 * | 1/2010 | Koyama | H01H 37/761 337/14 |
| 2014/0345927 A1 | 11/2014 | Himeno | |
| 2015/0055274 A1 | 2/2015 | Kimura | |
| 2018/0047507 A1 | 2/2018 | Koini | |

FOREIGN PATENT DOCUMENTS

| | | | |
|---|---|---|---|
| DE | 102015102866 A1 | 9/2016 | |
| DE | 102016221673 * | 5/2018 | .............. F02N 11/08 |
| EP | 0534775 A1 | 3/1993 | |
| EP | 2511915 A1 | 10/2012 | |
| JP | 2001-185766 A | 7/2001 | |
| JP | 2012-033652 | 2/2012 | |
| WO | WO 2013/093260 A1 | 6/2013 | |

OTHER PUBLICATIONS

DE102016221673, machine translation. (Year: 2018).*
International Search Report and Written Opinion of International Searching Authority corresponding to International Patent Application No. PCT/EP2020/054914, dated May 29, 2020, with English translation of International Search Report (11 pages).

* cited by examiner

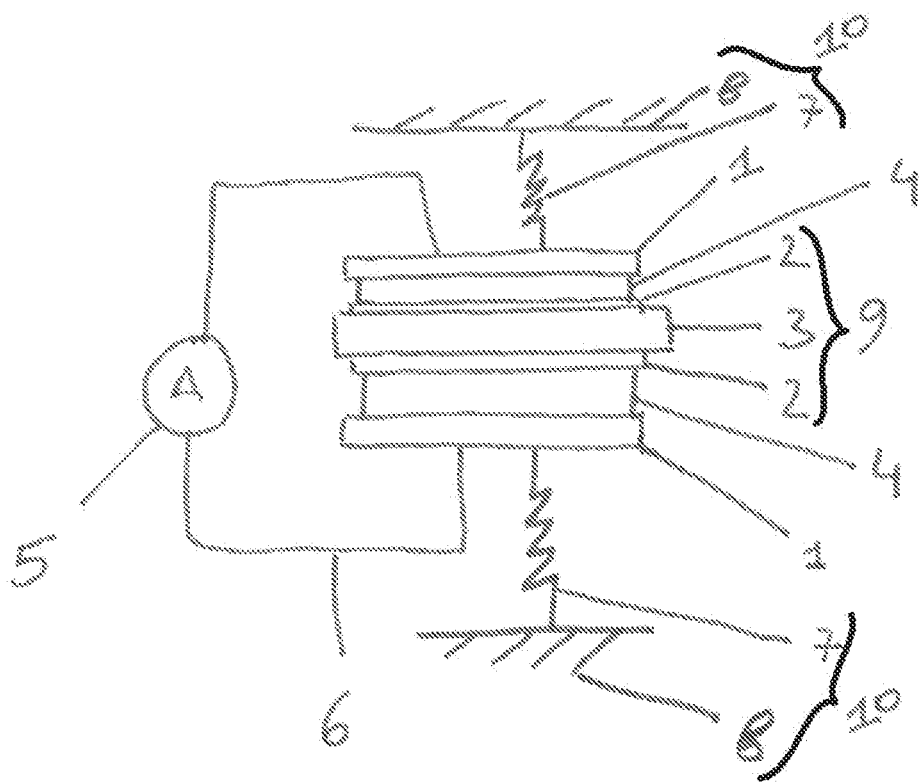

THERMISTOR, VARISTOR OR CAPACITOR COMPONENT WITH A FUSIBLE CONNECTING ELEMENT BETWEEN THE MAIN BODY OF THE COMPONENT

RELATED APPLICATIONS

This application is a U.S. National Stage of International Application No. PCT/EP2020/054914 filed on Feb. 25, 2020, which claims the benefit of German Patent Application No. 102019110374.6, filed on Apr. 18, 2019, each of which is hereby incorporated by reference in its entirety.

BACKGROUND OF THE INVENTION

Applications in which a relatively high specific power is applied to a component can lead to inhomogeneous or asymmetric heating of the component. Some regions of the component can be heated more strongly than other regions of the component. Examples of components in which such inhomogeneous or asymmetric heating occurs are PTC heating elements and inrush current limiters comprising an NTC ceramic.

The inhomogeneous or asymmetric heating can, owing to the thermal expansion of the component, lead to high mechanical stresses since the more strongly heated regions expand to a greater extent than the regions which are heated less strongly. The mechanical stresses can lead to failure or damage to the component. For example, a connecting material, a ceramic and/or an external electrode could break as a result of the mechanical stresses. Here, the electrical contact between the ceramic and the external electrode can be broken by the fracture and the function of the component can be impaired.

Even in the case of components in which mechanical stresses do not occur as a result of inhomogeneous or asymmetric heating, similar mechanical stresses can arise as a result of different coefficients of thermal expansion of various constituents of the component. Accordingly, there is also a risk of damage due to excessive heating in the case of these components.

It is an object of the present invention to provide an improved component which, for example, has a decreased probability of suffering damage on heating.

SUMMARY OF THE INVENTION

The object is achieved by a component according to claim 1. Advantageous embodiments of the component are subject matter of the dependent claims.

A component comprising a main body and at least one external electrode is proposed. The at least one external electrode is fastened by a connecting material to the main body. The main body and the external electrode have different coefficients of thermal expansion which determine a critical temperature which when exceeded results in a connection between the main body and the external electrode experiencing mechanical stresses which lead to damage to the component. The connecting material has a melting point which is lower than the critical temperature.

Due to the fact that the state of the matter of the connecting material can change from solid to liquid before a critical temperature is attained, it is not possible for the component to be heated to the critical temperature of the connection between the main body and the at least one external electrode on heating of the component, and the main body and the external electrode to remain joined to one another by the connecting material at the same time. Rather, the connecting material will melt before the critical temperature is attained. Any mechanical stresses which could arise during heating because of different coefficients of thermal expansion or because of an asymmetric or inhomogeneous heating process can be dissipated immediately by the melting of the connecting material. The low melting point of the connecting material can accordingly ensure that damage to the connection via the connecting material cannot occur on reaching the critical temperature since the connection via the connecting material can no longer exist at this point in time. In its liquid state, the connecting material cannot mechanically fasten the at least one external electrode to the main body.

Any distractive stresses can thus be eliminated in the component. The connecting material can be configured so that it resolidifies in a cooling phase after a heating phase and reestablishes the connection between the at least one external electrode and the main body.

The component can be, for example, a ceramic component. The component can be an electronic component. The component can be an electrical component. The component can be an active or passive component. The component can be a ceramic multilayer component. As an alternative, the component can comprise a single ceramic layer. The component can be provided for surface mounting (SMD=surface mounted device).

Particularly in the case of ceramic components, an external electrode comprising a metal or consisting of a metal and a main body comprising a ceramic material can have different coefficients of thermal expansion. The main body of the ceramic component can consist predominantly of a ceramic material. The different coefficients of thermal expansion can lead to the abovementioned mechanical stresses. For this reason, the use of a connecting material having a melting point below the critical temperature is especially advantageous in the case of a ceramic component.

Here, the "critical temperature" is the temperature at which a connection between the main body and the external electrode experiences mechanical stresses which lead to damage to the component. The mechanical stresses here can be caused by different expansions of the external electrode and of the main body. The critical temperature is thus determined essentially by the coefficients of thermal expansion of the external electrode and of the main body, which in turn depend on the materials of the external electrode and of the main body. The shapes and thicknesses of the external electrode and of the main body and also the type of connection can also influence the critical temperature. In establishing the critical temperature of the connection between the at least one external electrode and the main body, it is not necessary to take into account the fact that the connection can open due to melting of the connecting material when the melting point is exceeded.

The connecting material can be a solder material. Accordingly, the external electrode and the main body can be connected to one another by the connecting material via a solder connection. Solder connections can form a reliable electrical connection and also a reliable mechanical connection between the two connected partners.

The solder material can comprise tin and bismuth. In particular, the solder material can consist of tin and bismuth. Here, the solder material can have a proportion of from 35% by weight to 50% by weight of tin and a proportion of from 50% by weight to 65% by weight of bismuth. The proportion of tin is preferably in the range from 40 to 45% by weight. The proportion of bismuth is preferably in the range from 55 to 60% by weight. For example, the solder material can comprise 42% by weight of tin and 58% by weight of bismuth.

A solder material comprising a mixture of tin and bismuth in the abovementioned mixing ratios is well suited as connecting material between the at least one external electrode and the main body. The solder material can, due to the mixing ratio of tin and bismuth, have a melting point which is below the normal critical temperatures of components.

Below a temperature corresponding to its melting point, the solder material can establish a reliable electrical and mechanical connection between the external electrode and the main body. If the solder material is heated to a temperature above the melting point, the solder material can melt quickly, so that the connection formed by the connecting material is quickly parted. A risk of mechanical damage can quickly be eliminated thereby.

The melting point of the connecting material can be less than 150° C., preferably less than 140° C. These temperatures are below the usual critical temperatures for a connection between an external electrode and a main body. For example, the melting point can be 138° C. A melting point of 138° C. is obtained, for example, in the case of a connecting material which is a solder material comprising 42% by weight of tin and 58% by weight of bismuth.

The melting point of the connecting material can be greater than 100° C., preferably greater than 120° C. Melting of the connecting material at temperatures below 100° C. or below 120° C. is not necessary since no mechanical stresses between the main body and the at least one external electrode which are so large that they could lead to damage to the component are to be expected at these temperatures.

The main body can have at least one electrode comprising silver. The electrode can consist of silver. The electrode can, for example, be applied by means of a screen printing process. The electrode can be thinner than the external electrode. The electrode can be a metallization layer by means of which a ceramic layer of the main body can be electrically contacted with the at least one external electrode. The at least one external electrode can be fastened by the connecting material to the at least one electrode of the main body.

The main body and the at least one external electrode can be pressed against one another by a prestressing unit. The prestressing unit can be configured for continuing to contact the main body and the external electrode electrically when the connecting material has melted. The prestressing unit can also effect mechanical fastening of the external electrodes to the main body. The prestressing unit can fasten the at least one external electrode to the main body in such a way that no damage occurs to the component even when the external electrode and the main body are heated to a temperature which is greater than the critical temperature. For example, the prestressing unit can be configured so as to allow relative movements between the external electrode and the main body. Here, the prestressing unit can be configured so as to allow only relative movements at which the distance through which the at least one external electrode is moved relative to the main body is significantly less than a lateral extension of the external electrode and the main body. For example, the distance can be less than one hundredth of the lateral extension of the external electrode. Such a small amplitude of movement can be sufficient to dissipate the mechanical stresses while still being small enough for the external electrode and the main body to remain in electrical contact with one another and lie against one another with a sufficiently large area.

The prestressing unit can, for example, comprise a spring. The prestressing unit can exert a spring force on the at least one external electrode, by means of which the external electrode can be pressed against the main body.

The connecting material can be arranged on a surface of the main body and enclose a contact angle with the surface at which the connecting material in a liquid state remains between the main body and the external electrode. This can prevent the connecting material from flowing out from the main body after it has melted. The connecting material can still be at its position between main body and external electrode after a heating phase and can, in a later cooling phase, solidify and thus refasten the external electrode to the main body and contact it therewith.

The connecting material can have a greater specific resistance than the main body and than the external electrode. Accordingly, the connecting material can heat up to a greater extent than the main body and the external electrode. The connecting material can therefore reach its melting point before the main body or the external electrode have been heated to the critical temperature.

The at least one external electrode can comprise copper or Invar or have a copper-Invar-copper layer structure. Copper is a proven robust material for external electrodes. A copper-Invar connection has a coefficient of thermal expansion which can be similar to the coefficients of thermal expansion of the main body. Since the coefficients of expansion of an external electrode having a copper-Invar connection and a main body which comprises, for example, a ceramic material resemble one another, mechanical stresses occur to a smaller extent, so that the critical temperature can be higher than in the case of a component which has an external electrode consisting of copper.

The component can have a second external electrode which is fastened by the connecting material to the main body. The second external electrode can be fastened to the main body in the same way as the first external electrode. The connection between the second external electrode and the main body can also melt when the melting point of the connecting material is reached.

The component can be a thermistor, a capacitor or a varistor. The component can be a PTC heating element or an inrush current limiter comprising an NTC ceramic. In the case of the latter components, inhomogeneous or asymmetric heating is not unusual, so that the use of the connecting material having a melting point below the critical temperature is especially advantageous in the case of these components.

BRIEF DESCRIPTION OF THE DRAWINGS

A preferred working example of the component is illustrated below with the aid of the FIGURE.

FIG. 1 shows a schematic view of a component.

DETAILED DESCRIPTION OF THE DRAWINGS

FIG. 1 shows a component. The component in the working example shown here is a thermistor, in particular an NTC thermistor.

The component comprises a main body 9 which comprises a disk 3 composed of an NTC material. Furthermore, the main body 9 has two electrodes 2. The electrodes 2 are arranged on opposite sides of the disk 3. The electrodes 2 comprise silver or consist of silver. The electrodes 2 are very thin. The electrodes 2 can, for example, have been applied by means of a screen printing process to the disk 2. The present invention is not restricted to the main body 9 shown in FIG. 1. For example, the main body 9 could also have a multilayer structure.

For electrical contacting of the component, the component has two external electrodes 1. The external electrodes 1 can comprise copper or consist of copper. A first external electrode 1 is joined by a connecting material 4 to one of the electrodes 2 of the main body 9. A second external electrode 1 is joined by the connecting material 4 to the other electrode 2 of the main body 9.

The connecting material 4 is a solder material. Accordingly, the external electrodes 1 are joined by a solder connection to the main body 9. The solder material is a tin-bismuth compound. In particular, the solder material can comprise 42% by weight of tin and 58% by weight of bismuth. The solder material can have a melting point of 138° C.

The external electrodes 1 are connected via leads 6 to a voltage source 5. A voltage can be applied between the external electrodes 1 by means of the voltage source 5. Accordingly, the voltage source 5 can apply a voltage to the component via the external electrodes 1.

In such components, there is a risk of damage to the component by mechanical stresses which can arise when the component is heated to above a critical temperature. The external electrode 1 and the main body 9 have different coefficients of thermal expansion. There is therefore a critical temperature for a connection between the external electrodes 1 and the main body 9. If the external electrodes 1 and the main body 9 are heated, they expand to a different extent because of their different coefficients of thermal expansion, so that mechanical stresses arise. The critical temperature is defined as the temperature at which the mechanical stresses occurring at the connection between the external electrode 1 and the main body 9 become so large that damage to the component occurs. The damage can, for example, be in the form of a fracture.

The connecting material 4 used here is selected so that its melting point is below the critical temperature of the connection between the main body 9 and the external electrode 1. Accordingly, the connecting material 4 melts before damage to the component can occur as a result of excessive heating. Any mechanical stresses are immediately dissipated by melting of the connecting material 4. The component is accordingly constructed so that damage cannot occur as a result of mechanical stresses arising from overheating to above the critical temperature of the component.

The component additionally comprises a prestressing unit 10. The prestressing unit 10 ensures that the main body 9 and the external electrodes 1 remain in contact with one another when the connecting material 4 melts. The prestressing unit 10 presses the external electrodes 1 against the main body 9.

The prestressing unit 10 comprises two springs 7 and a support 8. The support 8 surrounds the component or consists of two elements which are arranged on opposite sides of the component.

Here, a first spring 7 is arranged on the side of the main body 9 on which the first external electrode 1 is arranged. The first spring 7 is clamped between the support 8 and the first external electrode 1. The first spring 7 presses the first external electrode 1 against the main body 9 with a clamping force. The second spring 7 is arranged on the opposite side of the main body 9, i.e. on the side on which the second external electrode 1 is arranged. The second spring 7 is arranged between the support 8 and the second external electrode 1. The second spring 7 presses the second external electrode 1 against the main body 9 with a clamping force.

The clamping forces exerted on the main body 9 by the first and second spring 7 act in opposite directions, so that the main body 9 and the two external electrodes 1 are pressed together. When the connecting material 4 melts, electrical contact and a mechanical connection between the external electrodes 1 and the main body 9 remain since the prestressing unit 10 ensures that the external electrodes 1 are pressed against the main body 9.

The connections between the external electrodes 1 and the main body 9 are such that the connecting material 4 remains in its position between the main body 9 and the respective external electrode 1 even after the connections have melted. In order to achieve this, a connecting material 4 having an appropriate contact angle can be selected. The appropriate contact angle can be present in the liquid state of the connecting material. Appropriate selection of the contact angle ensures that the connecting material 4 does not flow out from the main body 9. A very large contact angle is selected here.

The component can be configured so that when the component is heated, the connecting material 4 is heated more quickly than the external electrodes 1 and the main body 9. In particular, the connecting material 4 can have a higher specific resistance than the external electrodes 1 and the main body 9. Accordingly, it is ensured that the connecting material 4 is heated to a temperature which is greater than its melting point before the external electrodes 1 and the main body 9 are heated to the critical temperature and can suffer from excessive mechanical stresses due to different coefficients of expansion.

When the component is cooled, the connecting material 4 becomes solid again when the temperature goes below a solidification temperature. Since the connecting material 4 in the liquid state remains in its position between external electrode 1 and main body 9, the connecting material 4 connects the external electrodes 1 and the main body 9 to one another again after it has solidified.

Since the state of matter of the connecting material 4 between the main body 9 and the external electrodes 1 changes before heating to the critical temperature and, in particular, the connecting material 4 becomes liquid, destructive mechanical stresses do not occur in the component. Since the connecting material 4 solidifies again and mechanically connects the external electrode 1 and the main body 9 after a cooling phase, a good mechanical and electrical connection is produced, and this will melt again in the next heating cycle.

If the connecting material 4 is a solder material, aging mechanisms which could otherwise limit the life of a component having solder connections can also be eliminated by the liquefaction of the solder material.

LIST OF REFERENCE NUMERALS

1 External electrode
2 Electrode
3 Disk
4 Connecting material
5 Voltage source
6 Lead
7 Spring
8 Support
9 Main body
10 Prestressing unit

The invention claimed is:

1. A component comprising:
a main body and at least one external electrode that is fastened by a connecting material to the main body, the main body and the external electrode have different coefficients of thermal expansion that determine a critical temperature which, when exceeded, results in a connection between the main body and the external electrode experiencing mechanical stresses that lead to damaging to the component,
wherein the connecting material has a melting point that is lower than the critical temperature, and
wherein the main body and the at least one external electrode are pressed against one another by a prestressing unit.

2. The component according to claim 1, wherein the connecting material is a solder material.

3. The component according to claim 2, wherein the solder material comprises tin and bismuth.

4. The component according to claim 2, wherein the solder material comprises tin in a proportion of from 35% by weight to 50% by weight and bismuth in a proportion of from 50% by weight to 65% by weight.

5. The component according to claim 1, wherein the melting point of the connecting material is less than 150° C.

6. The component according to claim 1, wherein the melting point of the connecting material is less than 140° C.

7. The component according to claim 1, wherein the main body comprises a ceramic material.

8. The component according to claim 1, wherein the main body comprises at least one main-body electrode comprising silver.

9. The component according to claim 8, wherein the at least one external electrode is fastened by the connecting material to the at least one main-body electrode of the main body.

10. The component according to claim 1, wherein the connecting material is arranged on a surface of the main body and encloses a wetting angle with the surface at which the connecting material, when in a liquid state, remains between the main body and the external electrode.

11. The component according to claim 1, wherein the connecting material has a higher specific resistance than the main body and the external electrode.

12. The component according to claim 1, wherein the at least one external electrode comprises copper, a nickel-iron alloy, or both.

13. The component according to claim 12, wherein the at least one external electrode has a first layer comprising copper, a second layer comprising the nickel-iron alloy, and a third layer comprising copper.

14. The component according to claim 1, wherein the component comprises a second external electrode that is fastened by the connecting material to the main body.

15. The component according to claim 1, wherein the component is a thermistor, a capacitor or a varistor.

16. The component according to claim 1, wherein the component is a PTC heating element or an inrush current limiter comprising an NTC ceramic.

17. The component according to claim 1, wherein the component is an electronic component or an electric component.

18. A component comprising:
a main body having a surface with a main-body electrode thereon, the main body being made of a material having a first coefficient of the thermal expansion;
an external electrode positioned away from the main body, the external electrode being made of a material having a second coefficient of the thermal expansion that is different from the first coefficient of thermal expansion; and
a connecting material located between and making contract with the main-body electrode and the external electrode, the connecting material having a melting point that is below at least some of the operational temperatures of the component such that the connecting material changes from a solid state to a liquid state to relieve the mechanical stresses from the different coefficients of thermal expansion of the main body and the external electrode, the connecting material maintaining electrical connection between the main-body electrode and the external electrode when in both the liquid state and the solid state,
wherein the main body and the external electrode are pressed against one another by a prestressing unit.

19. The component according to claim 18, wherein the prestressing unit exerts a force between the main body and the external electrode to assist in maintaining electrical connection between the main-body electrode and the external electrode when the connecting material is in the liquid state.

* * * * *